United States Patent [19]

Jungkman et al.

[11] Patent Number: 4,661,707

[45] Date of Patent: Apr. 28, 1987

[54] DISC DETECTOR ASSEMBLY HAVING PREFABRICATED VACUUM CHAMBERS

[75] Inventors: David L. Jungkman, Hudson, N.H.; Peter N. Nicholson, Dracut; Thomas M. Brennan, Cambridge, both of Mass.

[73] Assignee: Honeywell Inc., Minneapolis, Minn.

[21] Appl. No.: 763,163

[22] Filed: Aug. 7, 1985

[51] Int. Cl.⁴ .............................................. G01J 1/00
[52] U.S. Cl. ................................. 250/352; 62/514 R; 62/514 JT
[58] Field of Search ......... 250/352; 62/514 R, 514 JT

[56] References Cited

U.S. PATENT DOCUMENTS 4,041,314 8/1977 Oppelt .................................. 250/352
4,474,036 10/1984 Ball et al. ............................. 250/352
4,488,414 12/1984 Jungkman et al. ................... 250/352

OTHER PUBLICATIONS

"Small Wonders: Microminiature Refrigerators for Cooling Detectors", by Wolfe et al., Photonics Spectra, Jul. 1983.

Primary Examiner—Craig E. Church
Assistant Examiner—John C. Freeman
Attorney, Agent, or Firm—John S. Solakian; George A. Leone, Sr.

[57] ABSTRACT

A miniature, nonevacuated, detector refrigerator assembly for use in infrared imaging systems is described. The assembly incorporates a miniature Joule-Thomson laminar refrigerator which serves as the substrate for the detector subassembly, electrical leads, as well as the primary structural element of the assembly. The detector subassembly is positioned on the cold region of the refrigerator, surrounded by two prefabricated vacuum chambers and capped by an optical window or filter as required. As a result, the detector is easily built and is cooled in an efficient manner.

19 Claims, 2 Drawing Figures

DISC DETECTOR ASSEMBLY HAVING PREFABRICATED VACUUM CHAMBERS

BACKGROUND OF THE INVENTION

The device of the present invention relates to cryogenically cooled detector assemblies, and, more particularly, to miniaturized cryogenically cooled detector assemblies used for thermal imaging systems.

In most thermal imaging systems using semiconductor detection devices, it is necessary to place the detectors in a vacuum environment for two reasons: first, to protect the detectors from condensation of gases, since the detectors operate at cryogenic temperatures, and second, to minimize heat load to the cryogenic refrigerator by these same gases. In the past, the cryogenic cooler (or "refrigerator") design and general packing requirements have been such that the detector dewar/refrigerator was economically nonexpendable. Because of the refrigerator size, the packaging of the system was generally large, and, therefore, the total system costs were high. Since the package design and weight were large, the cool-down time for these systems was relatively long.

As a result, the use of cryogenically cooled infrared detectors was limited to applications in which cool-down time and portability are not critical, and in which the detector system is reusable, for example, in airborne infrared reconnaissance cameras, tank or periscope sights, etc. The cost, size, weight and cool-down time of such systems have, for the most part, barred their use in small heat-seeking munitions.

Recently, a fast cool-down, low cost "microminiature" refrigerator has become commerically available, which, if packaged properly with infrared detectors, makes possible the use of detection assemblies in a variety of small, low cost applications. These applications include infrared binoculars, munitions, and other either highly portable or expendable applications. The theory and design of the refrigerator has been fully described by Robert Wolfe and Robert Duboc, Jr., "Small Wonders: Microminiature Refrigerators for Cooling Detectors", Photonics Spectra, July, 1983. A brief summary of these devices is included here as background to the apparatus of the present invention.

Like the prior art refrigerators typically used in infrared imaging systems, the new microminiature refrigerator operates on the principle of the Joule-Thomson effect. Gas at high pressure is expanded rapidly through a small orifice and therefore cools. The cooled gas is passed through a heat exchanger to precool the high pressure incoming gas, which provides lower temperature during expansion. This regenerative process continues to the liquification temperature of the gas. In prior imaging systems, a typical refrigerator was embodied in a long cylindrical "cold finger" consisting of capillary tubes and cooling fins, wherein the cooling function was directed to the end of the cylindrical cold finger. To complete the refrigerator, a close fitting closed cylinder was required to contain and direct the cold exhaust gas over the incoming high pressure gas in the heat exchanger area. This closed cylinder of precise diameter and length is incorporated into the detector dewar. The closed end is the detector support. A vacuum container surrounds the cylinder to limit heat flow and condensation.

These prior art refrigerators have several problems which make them impractical for use in small portable or expendable systems. First, the size of the refrigerator necessarily leads to a large package (dewar) size. Second, because of the large dewar size and the mass of associated components, these devices generally require several minutes to achieve operating cryogenic temperature. Third, the cost is increased because of several factors. For example, the cost to provide the precision diameter of the closed cylinder is increased. Also, the closed cylinder is approximately two (2) inches long so that, although the detectors are small, the package must be large in order to contain the refrigerator and must be of precise size. Further, since the area of the refrigerator is large, the surrounding gas must be removed, i.e., a vacuum is required, all of which increases cost. This vacuum must be maintained over the desired life of the system so that thermal conduction through the vacuum space will not increase the refrigerator temperature. The detector sitting on the end of the cold finger must be located accurately with respect to the optical system. To achieve this precise position many parts of the detector dewar require close tolerance manufacture and special assembly jigs. Finally, obtaining a hard vacuum requires glass-to-metal seals, welds, solder joints or brazes which are relatively expensive.

In the microminiature refrigerator design, the capillary tube and expansion chamber system comprising the Joule-Thomson refrigerator is embedded in a low thermally conductive substrate, such as glass. This device may take any geometric form, but generally is comprised of thin glass plates which have been etched to provide the required ports and capillary channels for the heat exchange sections, which are laminated to form a single planar element. Conventional infrared detector systems using the microminiature refrigerator have utilized packaging concepts similar to those embodied in systems having large prior art refrigerators. Specifically, in such systems the detector assembly has been mounted on the cold spot of the microminiature refrigerator, and the refrigerator has been placed inside a large vacuuable housing with an optical window located near the detector assembly. Pump-out ports, getters, and electrical vacuum feedthroughs typical of prior art systems have been included. In some cases, the electrical leads from the detector assembly have been printed directly on the refrigerator substrate.

One detector dewar assembly using such microminiature refrigerator design is shown in U.S. Pat. No. 4,488,414, issued Dec. 18, 1984, and assigned to the same assignee as the present invention. In such design, a foam insulated heat exchanger and a back-filled gas cavity is used.

It is, accordingly, an object of the present invention to provide an improved detector packaging assembly which is compact, requires fewer parts, has no tolerance build-up and is not expensive to build.

It is another object of the present invention to provide a self-contained detector package which is suited for use in portable systems requiring "instant on" capability, for example, in infrared binoculars, or infrared gun sights.

It is a further object of the present invention to provide a refrigerator and detector assembly design which can withstand high shock environments.

It is yet another object of the present invention to provide a miniature detector/refrigerator package that will operate continuously or intermittently.

SUMMARY OF THE INVENTION

The above and other objects of the present invention are achieved by using the microminiature planar refrigerator as both the substrate for the detector assembly and as the primary structural element of the package. The perimeter of the refrigerator remains at room temperature. Its surface has the electrical leads deposited on it from the cold spot to the perimeter which is at room temperature. Prefabricated vacuum chambers are used to insulate the heat exchanger areas. The housing, optical windows, etc., that complete the package are also supported by the refrigerator, which may be disc shaped for example.

The microminiature refrigerator provides fast cool-down time, shock resistance, compact size and low cost, such that a package may be developed that can be considered expendable. This detector package may be incorporated into disposable systems. It may also be incorporated into any system requiring a small low cost detector package.

In the present invention, the detector assembly is placed directly on the cold spot of the microminiature refrigerator. The electrical lead pattern is photodeposited directly on the surface of the refrigerator. The electrical leads extend near the edges of the substrate, which are at the ambient temperature. For example, in a disc shaped refrigerator, leads would terminate at contact pads located near the disc circumference. For a refrigerator of rectangular shape, the leads would terminate at pads near one or more of the edges thereof. A flexible cable or other suitable means may be coupled to the contact pads and connected at the other end to system electronics. The contact pads may also be connected by compressive bump contacts, i.e., by merely clamping the device into a circuit board.

The immediate area surrounding the detector assembly (heat exchanger) is insulated using prefabricated vacuum chambers. In a device using a disc shaped refrigerator, one such vacuum chamber might comprise an annular shaped chamber surrounding the detector assembly, which may then be capped with an optical filter or window material. Another prefabricated vacuum chamber is located on the bottom side of the refrigerator assembly opposite the detector assembly.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT(S)

Figure 1:
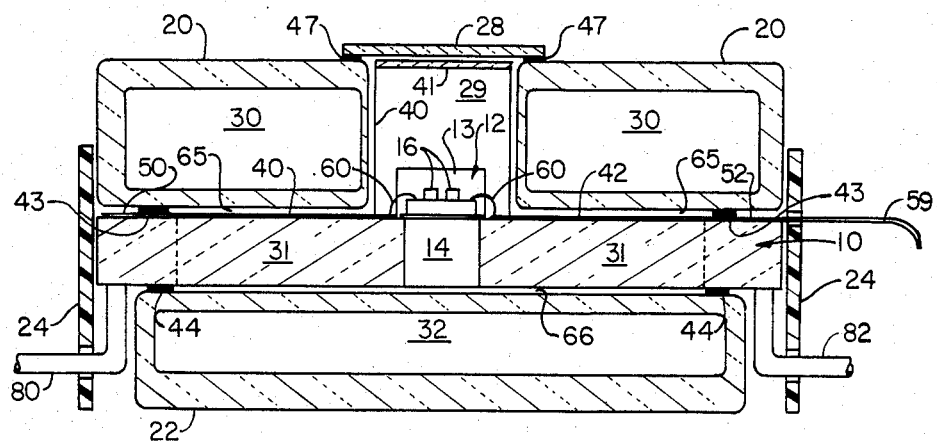
FIG. 1 shows a cut-away view of one embodiment of the apparatus of the present invention.

Referring to FIG. 1, a portion of an infrared receiver is shown, specifically, the refrigerator and detector assemblies comprising the apparatus of the present invention. This apparatus comprises a microminiature refrigerator assembly 10, detector assembly 12, prefabricated vacuum chambers 20 and 22, optical window and/or spectral filter 28, and support member 24. Detector assembly 12 is preferably mounted in a chamber 29 bounded by tube 40 to which is mounted a window 41.

Detector subassembly 12 is mounted directly onto the cryogenically cooled portion 14 of refrigerator 10. Detector electrical leads 40 and 42 (and others not shown), and contact pads 50 and 52 (and others not shown) are deposited directly on the surface of refrigerator 10 using well-known depositional techniques. Gold jumper wires 60 may be used to connect the detector assembly 12 with the detector electrical leads 40 and 42. If necessary, a cold shield, for example, slot shield 16, may be attached to detector assembly 12 to improve performance. In addition, a flap 13 of high thermal conductive material, such as, for example, copper, aluminum, beryllia, beryllium, silver or sapphire, may be placed under the detector assembly 12 and extend up into the chamber 29 such that gases within chamber 29 will condense preferentially on flap 13, rather than on detector assembly 12 during operation of refrigerator 10. Flap 13 extends from between the detector assembly 12 and the center cooled region 14 of assembly 10 at a forty-five degree angle into chamber 29. Flap 13 is soldered in place and may be, for example, less than 0.010 inches thick. In addition, or in the alternative, the interior chamber 29 may be filled with an appropriate gas, such as, for example, xenon or carbon dioxide, in order to preclude water vapor and to minimize heat flow during operation. The tube 40 of chamber 29 has minimum thermal conductivity and may be made from mylar material, or metalized mylar to reduce permeation of gases into chamber 29 during storage or use.

The structure of refrigerator 10 is such that region 14 of the refrigerator is at cryogenic temperatures, and the outer portion of the disc circumference under and around the contact pads is at ambient temperature. The region in between and contained within refrigerator 10 is the heat exchanger 31 (between the region 14 and the vertical dotted line) which is at some intermediate temperature. To best utilize the cooling potential of the refrigerator, the volume of chamber 29 is minimized and insulation over the heat exchanger 31 maximized. An annular prefabricated vacuum chamber 20, having vacuum 30 in the shape of a doughnut, is placed directly on refrigerator 10 surrounding detector assembly 12. A minimum thickness spacer 43 positions the vacuum chamber 20 just above the surface of refrigerator 10 so that in operation, convection currents between the bottom surface of chamber 20 and the top surface of refrigerator 10 are eliminated.

In addition to prefabricated vacuum chamber 20, there is included another prefabricated vacuum chamber 22 having vacuum 32 which provides further insulation of refrigerator 10 and detector assembly 12. The gas input port 80 and the gas output port 82 for the refrigerator 10 may be coupled, as shown in U.S. Pat. No. 4,488,414, to the refrigerator 10 directly through access openings in the refrigerator 10. By use of an external gas supply, not shown, and by use of such ports and the refrigerator 10, cool down of the detector assembly 12 is achieved.

The various elements of the disc detector assembly of the present invention may be easily assembled directly into and/or are supported by a collar 24 which may be made of plastic. Collar 24 may be in the shape of an open ended pipe or may be can shaped with cylindrical sides and a bottom which would be under the bottom surface of chamber 22. Collar 24 includes openings for the electrical cables 59 and the gas ports 80 and 82. The collar 24 may be held in place to the other elements by glue (not shown), and each of the elements are held together by glue so as to provide a dead air space 65 and 66 between the refrigerator 10 and the chambers 20 and 22. For example, glue 44, and/or 43, may be a ring of epoxy of controlled thickness thereby providing the dead air space 65 and 66 between the refrigerator 10 and the chambers 22 and 20.

The electrical cable 59 is attached by any convenient manner to representative pads 50 and 52. It should be understood that pads 50 and 52 need not terminate at opposite edges of the refrigerator 10, but rather, for example, such pads might terminate in any area of the periphery of the refrigerator as deemed convenience. The electrical cable 59 may incorporate, for example, a flexible cable where all leads are contained as a unit in one body. A connector may be used at the end of the electrical cable 59 to plug into the next assembly.

The optical windows 28 and 41 are attached to the chamber 20 and to the end of tube 40, respectively, with glue 47. Either of these windows 28 or 41 may be coated and used as a spectral filter or shaped as a lens. Typically, only one of such elements 28 or 41 will in practice be a lens.

Figure 2:
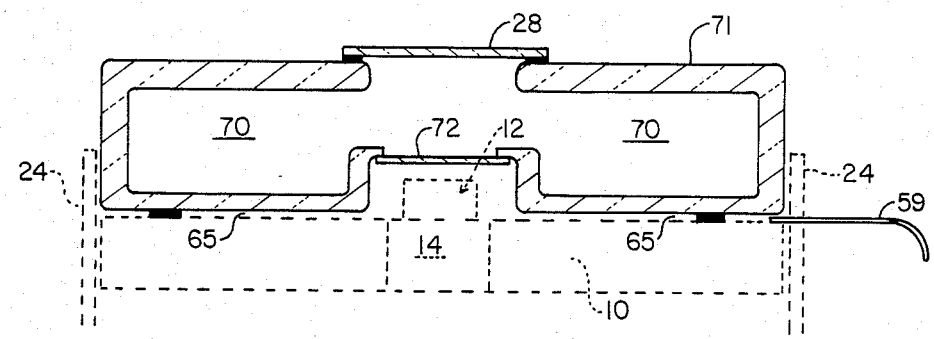
FIG. 2 shows a cut-away view of a portion of another embodiment of the apparatus of the present invention.

An alternative embodiment of the upper prefabricatd vacuum chamber 20 is shown in FIG. 2, wherein a prefabricated vacuum chamber 71, with vacuum 70, is used. Chamber 71 is also annular in shape, however, vacuum 70 extends around and over the detector assembly 12, such that a vacuum 70 is between the optical window and/or spectral filter 28 and the lower optical element 72, each of which are hermetically sealed in place prior to establishing a vacuum in chamber 71. Element 72 is preferably placed on the bottom side of the flanges of chamber 71 thereby making assembly easier and providing a better vacuum due to the pressure being greater on the outside of chamber 71. The tube 40 of chamber 29 is not required in such embodiment, however, the space 65 and the space around detector assembly 12 is preferably back-filled with gas for optimum thermal performance.

Having described the invention, what is claimed as new and novel and for which it is desired to obtain Letters Patent is:

1. An infrared energy apparatus for receiving infrared energy from a scene of interest, said apparatus having a refrigerator device, such apparatus comprising:
  A. said refrigerator device comprising:
    (i) an upper surface and a lower surface,
    (ii) means for cooling a first region of said refrigerator device,
    (iii) a second region which remains substantially at the ambient temperature of said infrared energy apparatus, and
    (iv) a third region for heat exchange, said third region at an intermediate temperature between that of said first and second regions;
  B. a tube to which is mounted a first optically transparent means such that the tube and optically transparent means form an interior chamber,
  C. a detector assembly having one or more detector elements mounted in said interior chamber on said upper surface of said refrigerator device in said first region such that said detector assembly is cooled by operation of said refrigerator device;
  D. an electrically conductive pattern applied to said upper surface of said refrigerator device, said pattern having electrical leads to enable electrical connection to said detector elements of said detector assembly;
  E. a first prefabricated vacuum chamber means positioned with respect to said refrigerator device such that said first and said third region are thermally separated from the ambient environment of said second region, said first chamber means shaped such that energy entering said apparatus from said scene of interest may be collected and measured by said detector assembly;
  F. a second prefabricated vacuum chamber means positioned in close proximity on the side of said refrigerator device opposite said first vacuum chamber means in order to provide thermal isolation of said detector assembly; and
  G. a second optically transparent means, coupled to said first vacuum chamber means, covering said interior chamber such that energy of the desired waveband from said scene of interest may be collected and measured by said detector assembly.

2. An apparatus as in claim 1 wherein said refrigerator device comprises a miniature planar disc-shaped refrigerator having said first region located substantially at the center of said disc shape, and said refrigerator device having said second region located substantially around said first region along the circumference of said disc shape.

3. An apparatus as in claim 1 wherein said first vacuum chamber means comprises a vacuum chamber which is annular in shape and which has a passage positioned substantially about said detector assembly such that energy from said scene of interest may be collected and measured by said detector assembly through said passage.

4. An apparatus as in claim 3 wherein said second optical transparent means is coupled to said first vacuum chamber means over said passage.

5. An apparatus as in claim 4 further comprising means for preferential condensation of gases within said interior chamber, said means for preferential condensation of gases substantially in proximity with said detector assembly.

6. An apparatus as in claim 5 wherein said means for condensation may be made from a piece of high thermally conductive material.

7. An apparatus as in claim 4 wherein said interior chamber is filled with a low thermally conductive gas to preclude water vapor and minimize conductive heat load.

8. An apparatus as in claim 7 wherein said gas may be xenon.

9. An apparatus as in claim 7 wherein said gas may be carbon dioxide or any other low thermal conductive gas.

10. An apparatus as in claim 4 wherein said interior chamber is filled with a gas having low thermal conductivity in order to provide partial vacuum during the operation of said apparatus.

11. An apparatus as in claim 1 wherein said second vacuum chamber means is disk shaped and is substantially the same diameter as said refrigerator device.

12. An apparatus as in claim 1 wherein said first chamber means is coupled to said refrigerator device so as to form a first small dead air space to eliminate convective heat flow and so as to provide further insulation of said detector assembly.

13. An apparatus as in claim 1 wherein said second chamber means is coupled to said refrigerator device so as to form a second small dead air space to eliminate convective heat flow and so as to provide further insulation of said detector assembly.

14. An apparatus as in claim 1 further comprising a flexible electrical cable and wherein said electrical leads are connected to said flexible electrical cable.

15. An apparatus as in claim 1 further comprising collar means, said collar means positioned around said refrigerator device and around substantially all of said first and second vacuum chamber means.

16. An apparatus as in claim 1 wherein said refrigerator device operates on the principle of the Joule-Thomson effect.

17. An apparatus as in claim 1 wherein said first and second optically transparent means are spectral filters.

18. An apparatus as in claim 1 wherein said first and second optically transparent means are lenses.

19. An infrared energy apparatus for receiving infrared energy from a scene of interest, said apparatus having a refrigerator device, such apparatus comprising:
   A. said refrigerator device comprising:
      (i) an upper surface and a lower surface,
      (ii) means for cooling a first region of said refrigerator device,
      (iii) a second region which remains substantially at the ambient temperature of said infrared energy apparatus, and
      (iv) a third region for heat exchange, said third region at an intermediate temperature between that of said first and second regions;
   B. a detector assembly having one or more detector elements mounted on said upper surface of said refrigerator device in said first region such that said detector assembly is cooled by operation of said refrigerator device;
   C. an electrically conductive pattern applied to said upper surface of said refrigerator device, said pattern having electrical leads to enable electrical connection to said detector elements of said detector assembly;
   D. a first prefabricated vacuum chamber means positioned with respect to said refrigerator device such that said first and said third region are thermally separated from the ambient environment of said second region, said first chamber means shaped such that a vacuum is located on all sides of said detector assembly over said first region, wherein said first optically transparent means is coupled to said vacuum chamber means to an integral part thereof and further comprising a second optically transparent means coupled to said first vacuum chamber means over said first region on a side of said first vacuum chamber means opposite said first optically transparent means, and wherein said second optically transparent means is an integral part of said first vacuum chamber means;
   E. a second prefabricated vacuum chamber means positioned in close proximity on the side of said refrigerator device opposite said first chamber means in order to provide thermal isolation of said detector assembly; and
   F. a first optically transparent means, coupled to said first vacuum chamber means, covering said first region such that energy of the desired waveband from said scene of interest may be collected and measured by said detector assembly.

* * * * *